United States Patent [19]
Wood et al.

[11] 3,794,134
[45] Feb. 26, 1974

[54] DETACHABLE ARTICULATION JOINT FOR GROUND VEHICLES

[75] Inventors: Walter A. Wood, San Jose; Dale Hutchins, Palo Alto, both of Calif.

[73] Assignee: Lockheed Missiles & Space Company, Inc., Sunnyvale, Calif.

[22] Filed: Sept. 28, 1972

[21] Appl. No.: 293,111

[52] U.S. Cl. .......................................... 180/79.2 B
[51] Int. Cl. ............................................. B62d 3/02
[58] Field of Search ...... 180/14 B, 79.2 B; 280/492, 280/495

[56] References Cited
UNITED STATES PATENTS

| | | | |
|---|---|---|---|
| 2,488,676 | 11/1949 | Mayner | 280/492 X |
| 2,852,273 | 9/1958 | Hudson | 280/408 X |
| 2,936,037 | 5/1960 | Anderson | 180/79.2 B |
| 3,524,514 | 8/1970 | Kratzke | 180/79.2 B |

*Primary Examiner*—Edward A. Sroka
*Attorney, Agent, or Firm*—Billy G. Corber; Donald H. Volk

[57] ABSTRACT

A two section ground vehicle and a joint for effecting rapid connection and disconnection of the sections. A joint that provides for articulation between the two vehicle sections. A joint having two complemental tapering parts so as to achieve precise self alignment between the vehicle sections on which they are mounted. Apparatus that renders one or both of the vehicle sections self supporting so that such section can be moved independently and while disconnected from the other section.

19 Claims, 8 Drawing Figures

PATENTED FEB 26 1974 3,794,134

DETACHABLE ARTICULATION JOINT FOR GROUND VEHICLES

This invention relates to a joint for joining two sections of a ground vehicle for relative articulation and more particularly to such joint that can be readily engaged and disengaged to effect separation of the two sections as desired.

Ground vehicles with which the joint of this invention are particularly suitable include a first or load carrying section and a second or power and control section which are joined to one another for relative articulation by a joint structure. The first or load carrying section can take any desired form, such as a container for hauling dirt, a trench digging device, a pole hole auger, a flatbed, et cetera. The second or power and control section normally includes, in addition to a prime mover, an operator station and electrical and hydraulic control systems for controlling the vehicle. Because the second or power and control section includes a greater number of complicated moving parts than the first or load carrying section, the second section is more expensive both as to first cost and as to necessity for maintenance. Accordingly, a readily attachable joint, as provided by the present invention, enables two or more different first or load carrying sections to be used interchangeably with a given power and control section and it permits expeditious disconnection of the power and control section as may be needed to expedite maintenance thereon.

Articulated vehicles can maneuver on and maintain traction on extremely rugged and irregular terrain because the wheels of both sections maintain contact with the ground at all times. Such is the case because the apparatus for joining the two sections affords articulation between the two sections. Relative movement between the two sections is afforded along a roll axis (a horizontal axis extending longitudinally of the vehicle) and a yaw axis (a vertical axis at the transverse midpoint of the vehicles). The two sections are typically incapable of self support when disconnected, however, because each is supported by a walking beam suspension system to optimize traction on irregular terrain. A suitable joint thus avoids relative movement between the sections about a pitch axis (a horizontal axis extending transversely of the vehicle). The present invention achieves these desiderata in a straightforward manner and permits the two sections to be readily detached from one another.

An object of the present invention is to provide a readily engageable or disengageable articulation joint for joining the two sections. This object is achieved by providing a socket affixed to one of the members and a member affixed to the other section that telescopically enters and is received and retained within the socket by uncomplicated mechanisms. The connection between the entry member and the section to which it is attached is adapted to afford the requisite movement with respect to the pitch and yaw axes.

A feature and advantage of achieving the above stated object is that the sole part mounted to the relatively inexpensive first or load carrying section is fixed and contains no moving parts. The more complex portion of the joint is mounted to the power and control section, whereby the economic feasibility of providing two or more load carrying sections is materially enhanced.

Another object of the present invention is to provide a joint that can be engaged rapidly and without undue care on the part of the operator of the vehicle. This object is achieved because the above mentioned socket has a relatively large mouth to receive the entry member. Inward of the mouth the socket tapers to a relatively small cross-sectional shape. The entry member has a corresponding shape so that the distal or outward extremity of the entry member is much smaller than the mouth of the socket. Thus, precise initial positioning of the two parts of the joint is unnecessary because the two parts telescope into alignment automatically as the two sections are moved toward one another. The socket tapers both longitudinally and vertically so that when the entry member is fully received in the socket, the two parts are precisely aligned and ready for final coupling.

Also contributing to the foregoing object are facilities for assuring that the entry member is positioned in general alignment with the socket before attempted insertion of the entry member therein. Alignment with respect to the yaw axis is achieved by linear actuators, such as hydraulic actuators, which position the entry member in a desired position with respect to the yaw axis. For positioning the entry member centrally with respect to the roll axis, the entry member is biased to a horizontal position by one or more resilient members. The resilient members are deformable so that after connection between the two sections is achieved, articulation with respect to the roll of axis can take place. Finally, one or both of the vehicle sections is provided with apparatus for varying the height of the joint member by adjusting the position of the entire section about the axis of the walking beam suspension system.

A power connection between the two sections is usually required so that all ground contacting wheels can be powered and so that equipment such as diggers and augers that are mounted on the load carrying section can receive power. A further object of the present invention is to provide an articulating joint that accommodates transmission of power therethrough. This object is achieved by providing as a part of the joint an intermediate block that is typically vertically spaced from the entry member and by providing through the block an opening to accommodate a drive shaft between the two sections. The drive shaft is coupled by conventional universal joints so as to avoid interference with articulation movement.

Yet another object of the present invention is to provide on at least one of the vehicle sections a mechanism for rendering such section self-supporting to a degree sufficient to enable the section to move, without any additional external support, into a coupled condition with the other section. When the two sections are coupled, the self-supporting mechanism is deactivated, thereby permitting full articulation of both vehicle sections.

The foregoing, together with other objects, features and advantages of the present invention, will be more apparent after referring to the following specification and accompanying drawings in which:

Referring more particularly to the drawings, reference numeral 12 indicates the rear or load carrying section of an articulated vehicle and reference numeral 14 indicates the front or power section which is joined to section 12 by an articulating joint 16. Vehicle section 12, in the example shown in FIG. 1, comprises a container for carrying dirt, rock or the like. Vehicle section 12 includes a pair of longitudinally extending frame members 18 and 19. Mounted on each frame member is a shaft 20 which supports a vehicle suspension system that includes a walking beam 22. At the front ends of the walking beams are mounted wheels, one of which is seen at 24 and at the rear ends are mounted wheels, one of which is seen at 26. Wheels 24 and 26 have their counterparts on the opposite side of the vehicle. The walking beam suspension system is conventional and permits both wheels 24 and 26 to remain in ground contact at all times. Through suitable drive trains not shown power is supplied to wheels 24 and 26, and their counterparts on the opposite side of the vehicle, and such power train is connected to front or power section 14.

Figure 1:
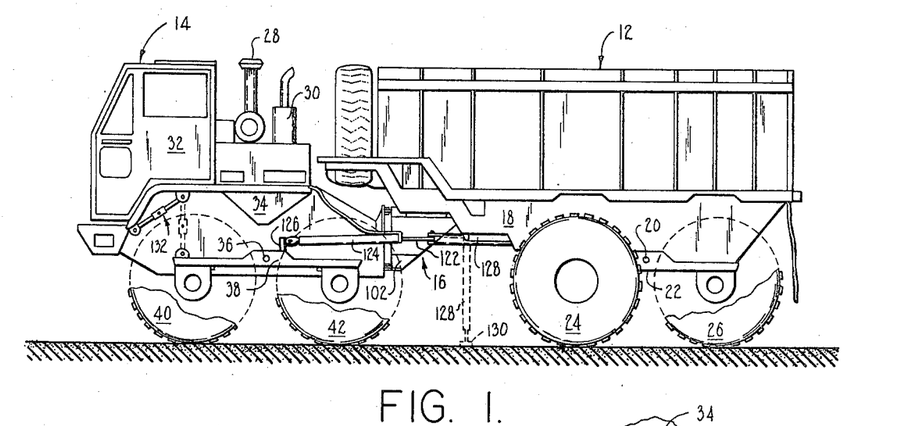
FIG. 1 is a partially schematic side elevation view of a vehicle employing an articulated joint of the present invention.

The front or power section of the vehicle includes a prime mover such as a gasoline or diesel engine of conventional form which is supplied with intake air through an inlet 28 and which exhausts combustion products through an exhaust system 30. The front section also includes an operator's cab 32 which is provided with appropriate steering and power controls as is typical. Front section 14 is supported on a main frame that includes a longitudinally extending frame structure 34 which mounts a suspension system shaft 36. The suspension system includes a walking beam 38 at the forward end of which is mounted a wheel 40 and at the rear end of which a wheel 42 arranged as has been described hereinabove with respect to wheels 24 and 26. Consequently, all wheels maintain ground contact irrespective of the configuration of the terrain on which the vehicle operates. Through suitable mechanisms not shown, power is supplied to wheels 40 and 42 and their counterparts on the opposite side of the vehicle, and wheel 40 together with its opposite counterpart is steerable.

Figures 1A, 2:
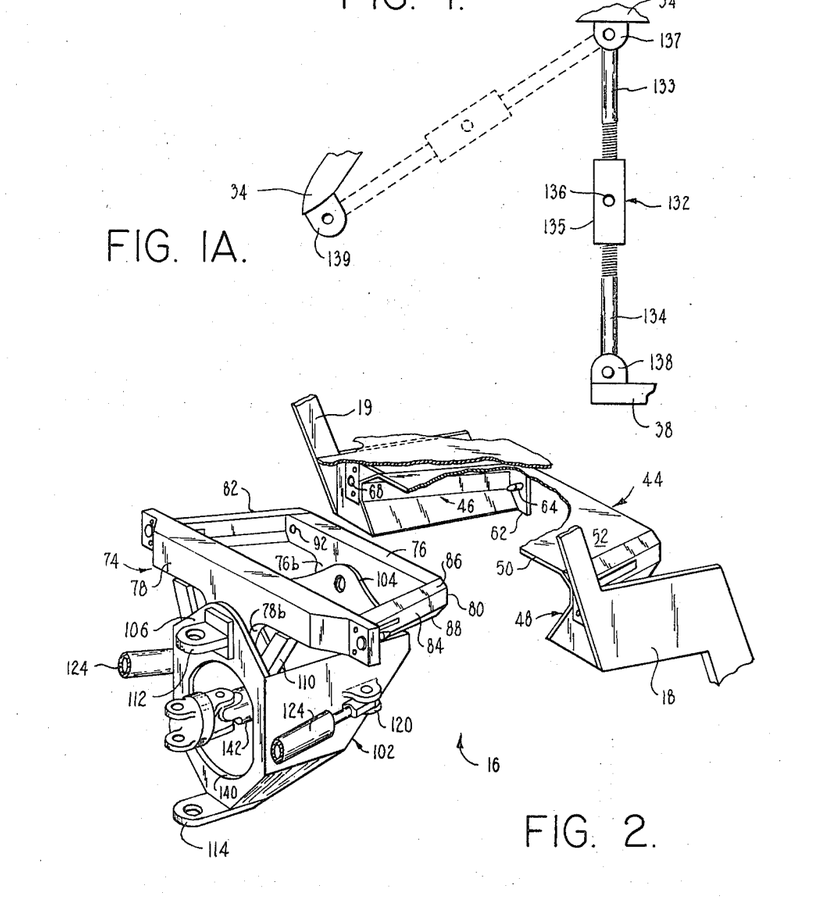
FIG. 1A is a fragmentary view of the vehicle of FIG. 1 showing a satisfactory self-supporting mechanism.
FIG. 2 is a perspective view of a joint according to the present invention in the disengaged position.
Figures 3, 3A:
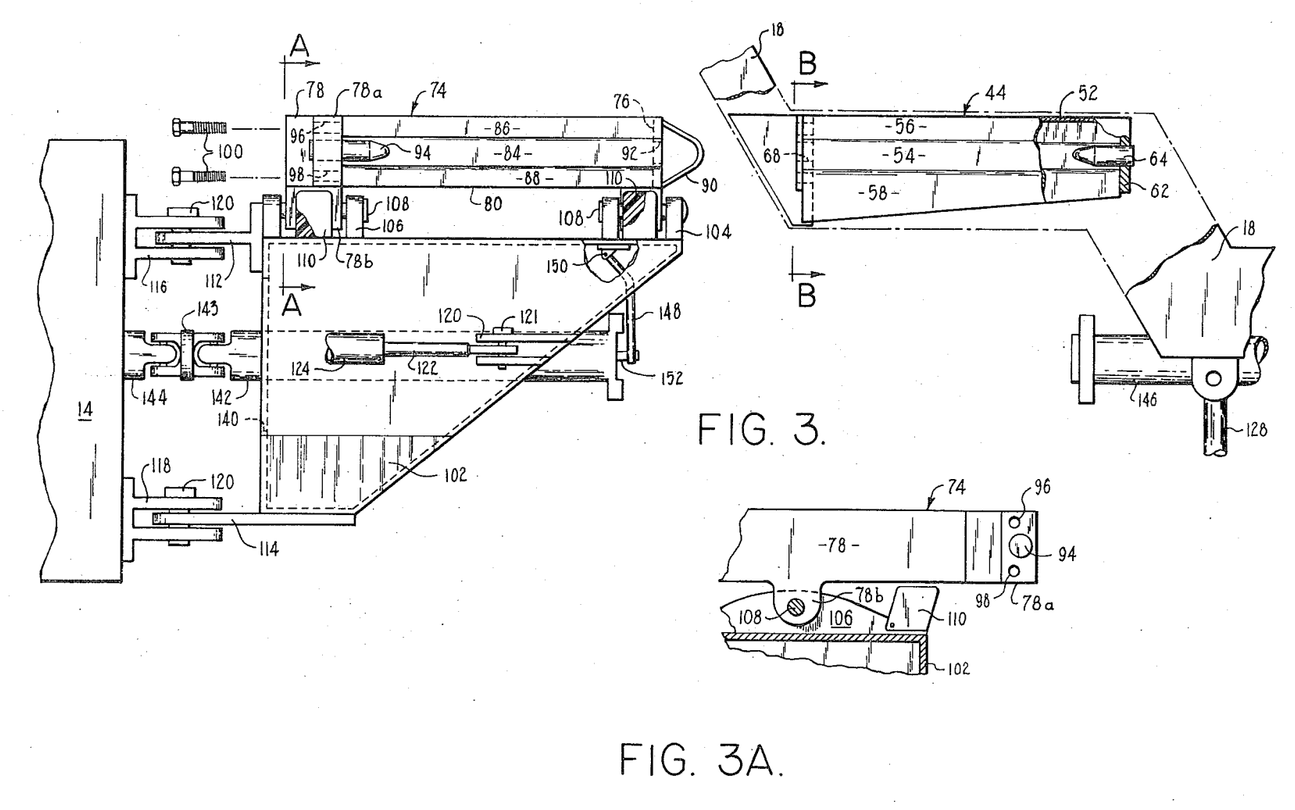
FIG. 3 is a side elevation view of the joint of the present invention in the disengaged position, portions being broken away to reveal internal details.
FIG. 3A is a cross-sectional view taken along line A—A of FIG. 3.
Figure 4:
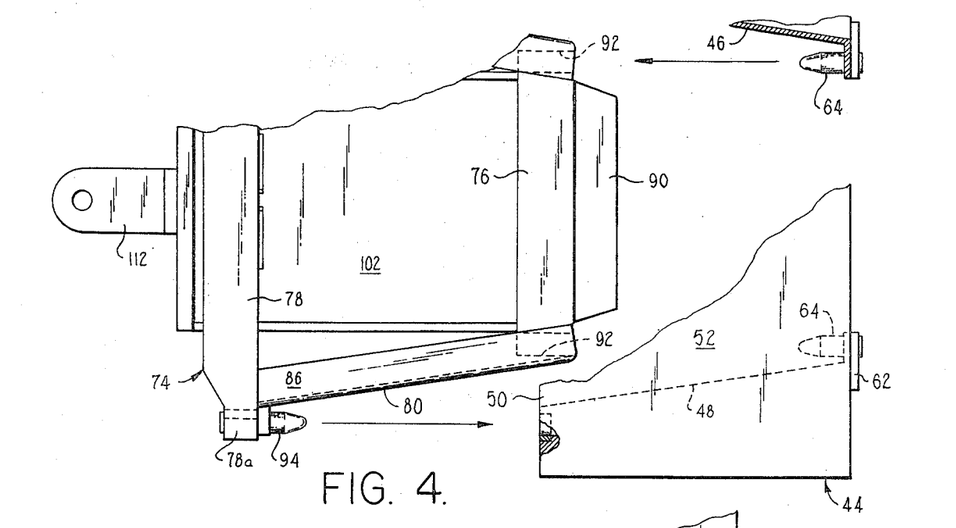
FIG. 4 is a plan view of the joint of FIG. 3.

With reference to FIGS. 2–4, the joint of the present invention includes a socket-forming member 44 which is suitably attached to rear section 12, such as by rigid attachment between frame member 18 and 19. The socket includes opposite lateral walls 46 and 48 (see FIG. 2) which confront one another to define therebetween a longitudinally extending throat. The socket defines a mouth 50 at its distal end and socket walls 46 and 48 converge in a mesial direction of mouth 50. Such convergence can be seen most clearly in FIG. 4 wherein lateral wall 48 is designated schematically by a broken line. Spanning the upper edges of lateral walls 46 and 48 is a rigid plate 52 which defines a planar surface that constitutes the upper vertical boundary of the socket throat. As can be seen in FIG. 2, there is no lower counterpart to plate 52; accordingly there is defined between the lower edges of lateral walls a longitudinally extending slot which is unobstructed so as to afford clearance space for other parts of the joint described hereinbelow.

Figure 3B:
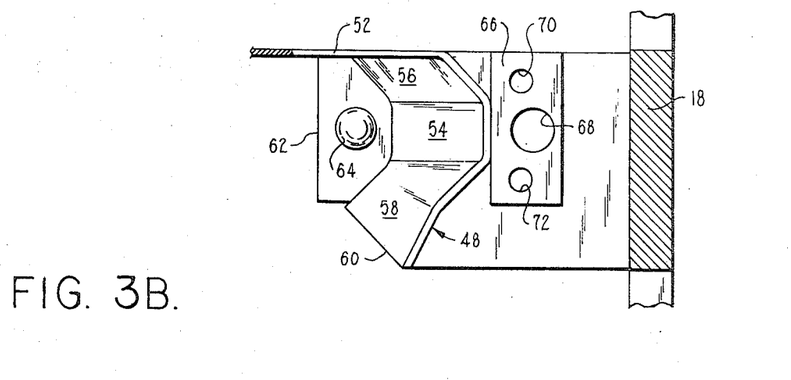
FIG. 3B is a cross-sectional view taken along line B—B of FIG. 3.

Since lateral walls 46 and 48 are substantially identical, only the constituent parts of lateral wall 48 will be described in detail in conjunction with FIGS. 3 and 3B. Lateral wall 48 is formed by a central elongated rectangular plate 54 which resides in a vertical plane and which converges from mouth 50 mesially of the socket. To the upper edge of the plate 54 is an inwardly sloping plate 56 which, as can be seen in FIG. 3B, forms an obtuse angle with plate 54. The upper edge of plate 56 is fastened, such as by welding, to top plate 52. Along the lower edge of plate 54 is fastened a lower plate 58 which also lies at an obtuse angle with respect to central plate 54. Thus, the three plates 54, 56 and 58 cooperate to define a convex inward shape in lateral wall 48. Lower plate 58 is preferably convex inward and has a lower edge 60 that tapers mesially of mouth 50 in an upward direction so as to expedite alignment of the parts of the joint.

At the inner or mesial extremity of each side of socket 44 is a transverse gusset plate 62. Projecting distally from gusset plate 62 is a pin shaped alignment element 64, which, as will appear subsequently, cooperates with a corresponding element to effect precise positioning of the parts of the joint. At the distal extremity of the mouth and in approximate longitudinal alignment therewith is a plate member 66 which defines an aperture 68. Above and below aperture 68 in member 66 are formed threaded holes 70 and 72, respectively. As will appear aperture 68 and holes 70 and 72 cooperate with other parts of the joint structure in achieving alignment and retention of the parts.

Attached to power section 14 of the vehicle, for cooperation with socket 44, is an entry member 74. Entry member 74 is complemental to socket 44 and is formed by a distal cross piece 76, a mesial cross piece 78, and opposite longitudinally extending side pieces 80 and 82. Distal cross piece 76 is shorter than mesial cross piece 78 as a consequence of which lateral pieces 80 and 82 taper distally inward to the same degree as lateral walls 46 and 48 of socket 44. Each of the lateral pieces has a convex outer surface complemental to the concave surface formed by lateral members 46 and 48. More specifically, the outer surfaces of longitudinally extending pieces 80 and 82 include a vertically extending plane 84, an upward sloping plane 86, and a lower sloping plane 88. Projecting distally from cross piece 76 is curved plate that defines a nose 90 which presents upper and lower surfaces that vertically diverge in a mesial direction. Thus, as the entry member 74 is moved into socket 44, the entry member is aligned both horizontally and vertically with respect to the socket.

The alignment afforded by the complementary shape of socket 44 and entry member 74 is rather coarse; fine alignment is achieved by pairs of alignment elements. One such element is pin 64 disposed at the mesial end of socket 44; such pin cooperates with an aperture 92 formed at the distal extremity of entry member 74 in cross piece 76 (see FIG. 4). As can be seen in FIG. 4, there are two transversely spaced apertures 92 and two transversely spaced pins 64. Apertures 92 are sized with respect to the outer diameter of pins 64 to afford a slip-fit therebetween. For the purposes of the present specification and claims, "slip-fit" is intended to define a size relationship such that pins 64 can enter holes 92 but, once within the holes, are not subject to excessive transverse movement.

At the mesial end of entry member 74, cross piece 78 is provided with lateral extensions 78a in which is fixed a bullet shaped pin 94 which is substantially identical to pins 64 heretofore described. Pins 94 are positioned to enter apertures 68 which are located at the distal end of socket 44. A pin 94 is provided on each side of the longitudinal center line of entry member 74 so as to afford lateral stability between the entry member and the socket when the pins are engaged in the apertures.

For fixedly retaining the entry member within socket 44 during operation of a vehicle on which the apparatus is installed, lateral extensions 78a are provided with upper and lower holes 96 and 98 which are respectively above and below pin 94. Holes 96 and 98 register respectively with holes 70 and 72 in plate member 66 so that bolts 100 can be passed through holes 96 and 98 and engaged in holes 70 and 72. There are two bolts 100 on each side of the joint whereby a firm connection between the vehicle sections is secured when all four bolts are engaged and tightened.

To afford articulation between the vehicle sections on which entry member 74 and socket 44 are mounted, the entry member is mounted for pivotal movement with respect to the roll axis to an intermediate block 102. Extending upward from intermediate block 102 at the distal end are a pair of gudgeon plates 104 and at the mesial end a pair of upstanding gudgeon plates 106. At the transverse center of entry member 74, cross pieces 76 and 78 are provided with depending extensions 76b and 78b which fit between respective pairs of gudgeon plates 104 and 106. Pivot shafts 108 pass through aligned holes in the depending extensions and in the gudgeon plates; because pins 108 lie on the roll axis, movement of entry member with respect to such axis is afforded.

On the upper surface of intermediate block 102 in lateral alignment with cross pieces 76 and 78 are supporting blocks 110 (see FIGS. 3 and 3A) which support entry member 74 in a horizontal position when it is disengaged from socket 44, thereby expediting alignment during connection of the joint. Supporting blocks 110 are constructed of hard rubber or like resiliently compressible material so that movement of entry member 74 on the roll axis about shafts 108 is possible. Supporting blocks 110 also perform a shock absorbing function in that they prevent the lower surface of entry member 74 from contacting the upper surface of intermediate block 102 when the joint is subjected to extreme movement about the roll axis.

For affording movement about the yaw axis, intermediate block 102 at the mesial extremity thereof is provided with horizontally extending gudgeon plates 112 and 114. Attached to the rear of vehicle section 14 are corresponding paired gudgeon plates 116 and 118. Gudgeon plates 112, 114, 116 and 118 are provided with aligned holes which receive pins 120 thereby affording pivotal movement of block 102 with respect to vehicle section 14 about a vertical yaw axis.

Mechanism for controlling the position of intermediate block 102 about the yaw axis in order to facilitate steering of the vehicle is provided. Such mechanism includes a pair of horizontal gusset plates 120 which extend from each side of block 102. Pivotally attached between respective pairs of gusset plates by means of a pin 121 is a rod 122 of a hydraulic cylinder 124. The opposite end of hydraulic cylinder 124 is connected at 126 to frame structure 34 of the vehicle section 14. Cylinders 124 are supplied with pressurized hydraulic fluid from a control system and source (not shown) which is linked to the steering mechanism that actuates front wheels 40 so that rear vehicle section 12 tracks vehicle section 14 during turning movement of the vehicle.

Because both vehicle sections 12 and 14 are provided with walking beams suspensions, neither is self-supporting when disconnected from the other. In order to render rear section 12 self-supporting during periods that section 14 is being used with other rear load carrying sections, there is attached for pivotal movement with respect to frame member 18 a conventional jack structure 128 which has a relatively large area pad 130 for contact with the ground at a point remote from the axis of pin 20 to support the vehicle section 12 in an upright position. Jack 128 is pivotally foldable to the position shown in solid lines in FIG. 1 when the rear section is joined to front section 114. The jack is retained in the folded position by suitable clamps or the like which are conventional and are therefore not shown in the drawing.

For supporting vehicle section 14 in an upright position while at the same time permitting the vehicle section to be moved about there is a turnbuckle link 132. The turnbuckle link includes oppositely threaded rods 133 and 134 which are joined by a correspondingly threaded adjusting sleeve 135. Sleeve 135 defines at least one hole 136, or the like, for affording engagement of the sleeve by a suitable adjusting tool. The link is permanently pivotally connected to the frame of vehicle section 14 at 137 and removably connected to one extremity of walking beam 38 at a suitable connection 138 such as a removable clevis connection. Thus, when link 132 is in the position shown in solid lines in FIG. 1A, the link locks out pivotal movement of walking beam 38 relative to frame 34 and front section 14 is stabilized. Accordingly vehicle section 14 can move out of engagement with a socket 44 associated with one load carrying section 12 and into engagement with another section. Moreover, link 132 is useful to stabilize vehicle section 14 during maintenance operations thereon. Once vehicle section 14 is joined to another vehicle section 12, connection 138 is disengaged, and the link pivoted out of the way and fastened at 139 in a position corresponding to that shown here by broken lines in FIG. 1A.

For connecting power between vehicle sections 12 and 14, intermediate block 102 is of hollow construction, thereby defining a tunnel 140 therethrough. A shaft 142 extends through the tunnel and connects, through a universal joint 143, power from a shaft 144 that is driven by the prime mover in vehicle section 14 to a shaft 146 which forms the power input to the power transmission system within load carrying section 12. For supporting the outer or distal end of shaft 142 when the vehicle sections are disconnected from one another, a support arm 148 is pivotally mounted to block 102 at 150 and includes a pin 152 at the outer end thereof which engages a complemental hole in the outer end of shaft 142. When shaft 142 is connected to shaft 146, arm 148 pivots upward to an inoperative position.

In explaining the operation of the present invention, it will be assumed that vehicle sections 12 and 14 are disconnected from one another and that jack 128 supports vehicle section 12 and turnbuckle link 132 supports vehicle section 14 so as to lock out pivotal movement of walking beam 38 with respect to frame member 34 of vehicle section 14. In such position, mouth 50 of socket 44 presents a broad, unobstructed opening for receipt of the relatively narrow distal end of entry member 74. Vehicle section 14 is then backed slowly toward vehicle section 12. Turnbuckle link 132 and jack 128 can be adjusted to bring the entry member and socket into approximate vertical alignment, and slight misalignment in the vertical direction is compensated for by nose 90 which contacts the lower planar surface of plate 52 should entry member 74 be slightly high with respect to socket 44. As backing movement of vehicle section 14 proceeds, one lateral face 80 of entry member 74 eventually contacts the corresponding lateral wall 46 or 48 of socket 44. Because of the concave configuration of walls 46 and 48 and the complemental convex configuration of walls 80 and 82, contact and further rearward movement of the entry member bring the entry member into proper vertical alignment within socket 44. The horizontal convergence of walls 46 and 48 of socket 44, and the complementary convergence of side pieces 80 and 82 of socket 74, effects transverse alignment of the entry member in the socket. As the entry member approaches full engagement within socket 44, the bullet noses of pins 64 and 94 enter their associated apertures 92 and 68 respectively. The shape of the bullet or tapered nose is such as to afford a fine or precise alignment between the members so that when the cylindric sections of the pins fully enter their associated apertures, bolt holes 96 and 98 are precisely aligned with corresponding threaded holes 70 and 72. Thereupon, the four bolts 100 can be installed and engagement of the joint is complete. Connection of shaft 142 to shaft 146 and pivotal movement to a stored position of turnbuckle link 132 and jack 128 readies the vehicle for normal operation.

It will be appreciated that when the joint is connected as has been described in the preceding paragraph, transverse stability is afforded because opposite pins 94 and their associated apertures 68 are transversely spaced from one another and because pins 64 and their associated apertures 92 are longitudinally spaced from pins 94. Moreover, bolts 100 in addition to retaining the entry member 74 within throat 44, contribute to the stability. Finally, the engagement of the convex outer surfaces of side pieces 80 and 82 of entry member 74 engage with lateral walls 46 and 48 of socket 44 assists in preventing relative movement between the entry member and the throat.

Movement about the horizontal roll axis is afforded by pins 108 and gusset plates through which they pass. Movement about the vertical yaw axis is afforded by pins 120 and gusset plates through which they pass. Accordingly, all eight wheels on the assembled vehicle can maintain ground contact over extremely irregular terrain.

In order to disconnect section 14 from section 12 to use the former section with another working section, it is only necessary to lower jack 128, to connect turnbuckle link 132 at 138, to disconnect shaft 142 from shaft 146, to remove bolts 100 and to drive vehicle section 14 forward.

Figure 5:
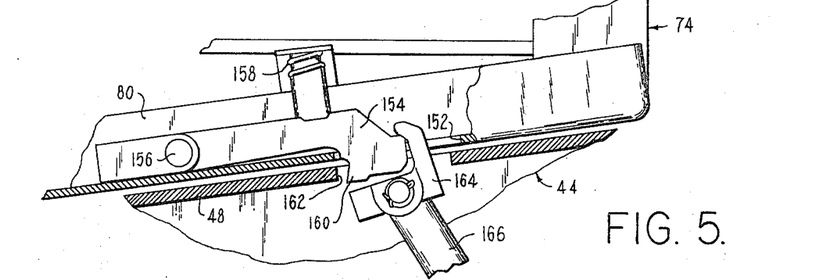
FIG. 5 is a fragmentary detail view of a modification of the present invention.

A modification of the invention is shown in FIG. 5 and affords a latch which retains entry member 74 in socket 44 temporarily so as to expedite insertion of bolts 100. For this purpose, the lateral frame pieces of entry member 74 exemplified at 80 in FIG. 5, are excised at 152 to accommodate a dog 154 which is pivotally mounted at 156 to the inner surface of side 80. A spring 158 is provided for biasing the dog outward. The dog has an abutment 160 which cooperates with the edge of a complemental excision 162 formed in lateral wall 48 of socket 44. Excision 162 is so positioned that when the entry member 74 is fully seated in socket 44, abutment 160 engages the edge of the excision. Dog 154 then retains the entry member within the socket with sufficient rigidity that bolts 100 can be inserted. For disengaging dog 174, there is pivotally mounted exterior of lateral wall 48 a release cam 164 which, when rotated in a clockwise direction as viewed in FIG. 5 by actuation of a lever 166, retracts dog 154 out of engagement with excision 162. In such position entry member 74 can be readily removed from socket 44.

Thus, it will be seen that the present invention provides an apparatus for joining two sections of a ground vehicle for relative articulation, which apparatus is fast acting, simple and rugged in construction, and which provides precise alignment between the two vehicle sections. Moreover, because of the novel construction of the joint apparatus, the most complex and expensive part thereof is mounted to the most complex and expensive vehicle section. Accordingly, the joint is compatible with providing a plurality of different load carrying sections 12 with one power section 14. Finally, the joint is adapted for cooperation with a lock out device which permits the power section to be moved under its own power between various load carrying vehicle sections 12.

Although one embodiment of the invention has been shown and described, it will be obvious that other adaptations and modifications can be made without departing from the true spirit and scope of the invention.

What is claimed is:

1. Apparatus for joining first and second sections of a ground vehicle for relative articulation comprising a socket forming member fixedly mounted to said first section, said socket forming member having opposite lateral walls that are spaced to define a throat passage longitudinally of said first section that terminates in a mouth distally of said first section, said walls converging mesially from said mouth so that said throat is tapered, an entry member complementary with and receivable in said socket, means for retaining said entry member to said second section, said joining means including an intermediate block for pivotal movement about a longitudinal roll axis, and means for attaching said intermediate block to said second section for pivotal movement about a vertical yaw axis.

2. Apparatus according to claim 1 wherein said socket forming member includes means defining a generally horizontal rigid planar surface normal to said lateral walls and disposed between said walls at one vertical extremity thereof, said surface forming means constituting one vertical boundary of said throat passage, the opposite vertical boundary of said throat being unobstructed to define a longitudinally extending slot, and said entry member attaching means being disposed so as to reside in alignment with said slot to permit longitudinal movement of said entry member relative to said socket.

3. Apparatus according to claim 2 wherein said planar surface forming means is disposed at the upper vertical extremity of said throat passage and wherein said entry member attaching means and said intermediate block are disposed below said entry member so that the roll axis between said entry member and said intermediate block is below said throat passage when said entry member is received in said socket.

4. Apparatus according to claim 1 wherein the lateral walls of said socket are concave inward and wherein said entry member includes convex lateral surfaces complementary to said socket walls.

5. Apparatus according to claim 4 wherein said lateral socket walls are each formed by a central vertical plate having upper and lower generally parallel edges, an inward sloping upper plate fixed to said upper edge at an obtuse angle to said central vertical plate, and an inward sloping lower plate fixed to said lower edge at an obtuse angle, said lower plate being wider at the distal extremity thereof than at the mesial extremity thereof so that said socket tapers mesially from said mouth to position said entry member vertically in said socket.

6. Apparatus according to claim 1 in combination with means for effecting precise alignment of said entry member relative said socket comprising at least first and second pairs of cooperating alignment elements, each said pair including means forming an aperture in a plane transverse of said throat passage and a pin shaped for penetration of said aperture, one element of each said pair being mounted rigid with said socket and the other element being mounted rigid with said entry member, said first and second pairs being longitudinally spaced from one another so as to resist relative movement about a pitch axis when said entry member is received in said socket.

7. Apparatus according to claim 6 wherein said aperture forming means of said first pair is mounted in approximate longitudinal alignment with said mouth laterally outward of said throat passage and wherein said entry member includes at the mesial extremity thereof a laterally extending rigid flange, the cooperating pin being mounted on said flange and extending distally thereof for entry into said aperture, and wherein said aperture forming member of said second pair is mounted on the distal extremity of said entry member, said socket including means for mounting the cooperating pin at the mesial extremity of said throat passage in longitudinal alignment with last said pin so that last said pin enters the cooperating aperture of said second pair when said entry member is received in said socket.

8. Apparatus according to claim 7 including means forming aligned holes adjacent respective elements of said first pair of alignment elements and means extending through said holes for drawing together said hole forming means when said entry member is received in said socket.

9. Apparatus according to claim 6 wherein said aperture forming means forms a circular aperture and wherein said pin includes at the mesial extremity thereof a cylindric portion having a diameter sized for a slip fit in said aperture, said pin having on the distal end thereof a tapered bullet-shaped nose to afford entry of said pin into said aperture.

10. Apparatus according to claim 1 wherein said retaining means comprises means attached to said socket and to said entry member for defining holes that are aligned when said entry member is received in said socket and means extending through said holes for drawing together said hole forming means when said entry member is received in said socket.

11. Apparatus according to claim 10 wherein one of said holes is interiorly threaded and wherein said drawing means includes a bolt having a threaded portion for meshing with the threads in said one hole so that in response to rotation of said bolt said hole defining means are drawn together to retain said entry member in said socket.

12. Apparatus according to claim 1 wherein said intermediate block defines a longitudinally extending clearance opening therethrough for accommodating a drive shaft therethrough between said first and second vehicle sections.

13. Apparatus according to claim 12 wherein said intermediate block attaching means includes upper and lower vertically aligned spaced apart pivots, said opening in said intermediate block being disposed between said pivots.

14. Apparatus according to claim 1 in combination with first and second actuators respectively extending from opposite sides of said intermediate block to said second vehicle section for controlling the position on said intermediate block about the vertical yaw axis.

15. Apparatus according to claim 1 in combination with means for supporting said entry member relative said intermediate block in an upright position when said entry member is disengaged from said socket, said supporting means being resilient so as to afford movement of said entry member about the longitudinal roll axis.

16. Apparatus according to claim 15 wherein said supporting means comprises first and second compressible pads mounted on opposite sides of said attaching means and of the longitudinal roll axis, said pads being disposed between said intermediate block and said entry member and having a dimension in an uncompressed state sufficient to support said entry member in an upright position when said entry member is disengaged from said socket.

17. Apparatus according to claim 1 in combination with means for latching said entry member in said socket, said latching means including a portion of one lateral wall of said socket forming member defining an excision, said entry member having a corresponding excision that aligns with first said excision when said entry member is received in said socket, a dog mounted at the margin of one of said excisions for movement into and out of said excisions, and means for resiliently biasing said dog into said excisions for preventing relative longitudinal movement of said entry member and said socket.

18. Apparatus for joining first and second sections of a ground vehicle for relative articulation comprising an intermediate block, means for mounting said block to said first section for pivotal movement about a roll axis, said block mounting means includes a socket forming member fixedly mounted to said first section, said socket forming member having opposite lateral walls that are spaced to define a throat passage longitudinally of said first section that terminates in a mouth distally of said first section, said walls converging mesially from said mouth so that said throat is tapered, an entry member complementary with and receivable in said socket, means for retaining said entry member in said socket, means for joining said entry member to said intermediate block for pivotal movement about a roll axis, and means for attaching said intermediate block to said second section for pivotal movement about a vertical yaw axis.

19. Apparatus for joining first and second sections of a ground vehicle for relative articulation comprising an intermediate block, means for mounting said block to said first section, said block mounting means including a first coupling member rigid with said first section, a second coupling member telescopically and longitudinally engageable and disengageable with said first member, and means for mounting said second coupling member to said intermediate block for pivotal movement about a roll axis, means for attaching said intermediate block to said second section for pivotal movement about a vertical yaw axis, said second section includes a suspension system having at least two ground contacting members thereon, means for mounting said suspension system to said second section for substantially free pivotal movement about a pitch axis, and means extendable between said second section and said suspension system for selectively locking out relative movement therebetween about the pitch axis so that said second section is self-supporting when disengaged from said first section, said locking out means being adjustable to afford vertical alignment of said first and second coupling members.

* * * * *

UNITED STATES PATENT AND TRADEMARK OFFICE
CERTIFICATE OF CORRECTION

PATENT NO. : 3,794,134
DATED : Feb. 26, 1974
INVENTOR(S) : Walter A. Wood; Dale Hutchins It is certified that error appears in the above-identified patent and that said Letters Patent is hereby corrected as shown below:

Claim 1, at Column 8, lines 57-58 should read:

ceivable in said socket, means for retaining said entry member in said socket, means for joining said entry member to said second section, said joining means in- Signed and Sealed this Thirty-first Day of December 1985

[SEAL]

Attest:

DONALD J. QUIGG

Attesting Officer

Commissioner of Patents and Trademarks